March 11, 1952　　　J. O. RABY　　　2,588,761
MOTOR VEHICLE OIL LEVEL INDICATOR
Filed April 13, 1951
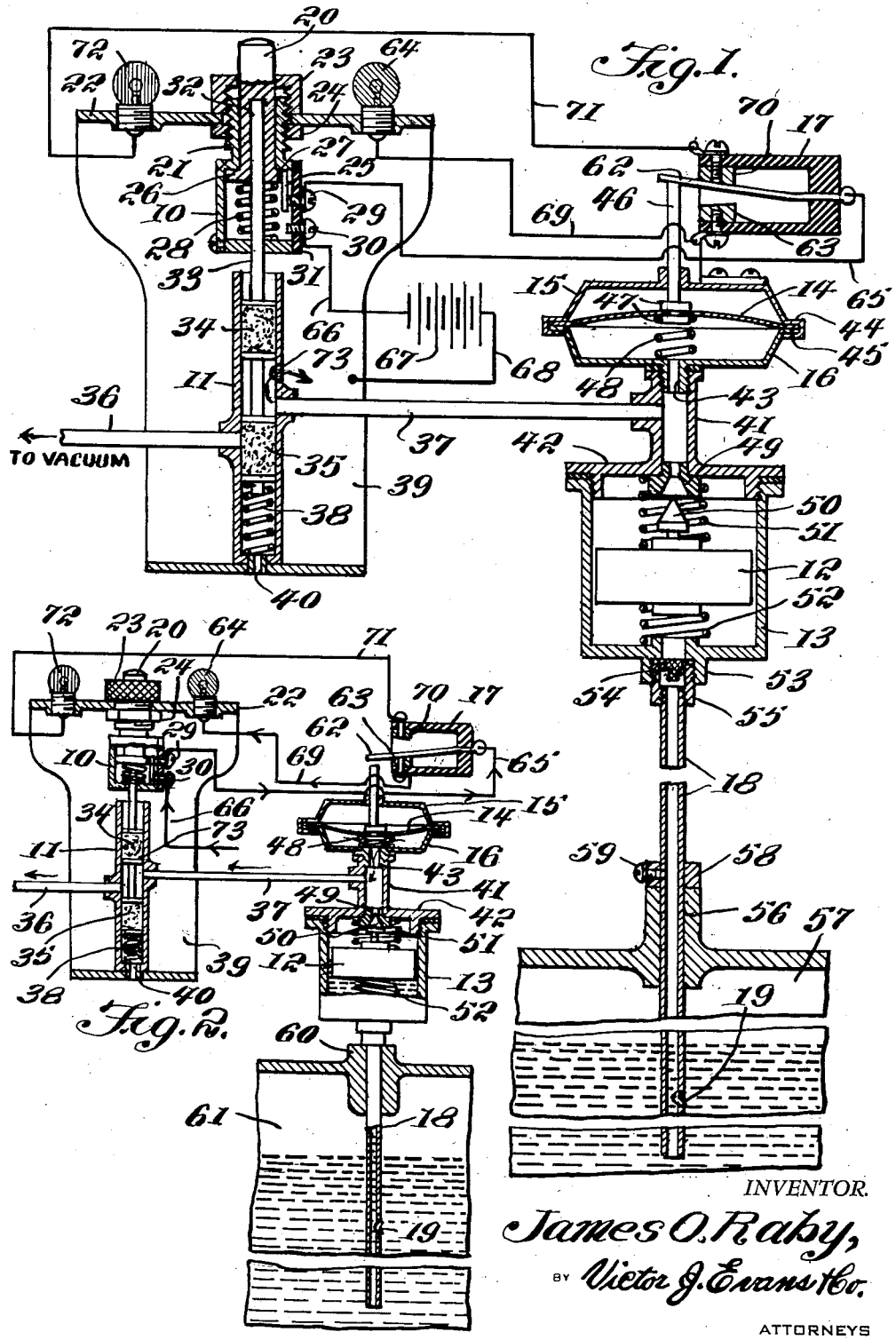
INVENTOR.
James O. Raby,
BY Victor J. Evans & Co.
ATTORNEYS Patented Mar. 11, 1952

2,588,761

UNITED STATES PATENT OFFICE 2,588,761

MOTOR VEHICLE OIL LEVEL INDICATOR

James O. Raby, Elizabeth City, N. C.

Application April 13, 1951, Serial No. 220,759

5 Claims. (Cl. 177—311)

This invention relates to devices for indicating the level of oil in the engine of a motor vehicle on the instrument board or panel, and in particular a vacuum actuated instrument having a button in combination with a red and green light wherein as the button is pressed the red light first shows and if the oil level of the engine is substantially to the level required the red light goes out and the green light shows whereas if the oil level is low the green light does not show and the red light continues on.

The purpose of this invention is to provide means for determining the level of oil in the crank case of a motor vehicle engine from the instrument board without passing the oil through a gauge or tube on the instrument board.

Various types of devices have been provided for indicating the oil level of motor vehicle engines but where the devices are connected in the oil lines there is a possibility of leakage and owing to constant knocks and jars to which a motor vehicle is subjected it is difficult to provide contacts in the crank case or actuated by a float. With this thought in mind this invention contemplates a device having an elongated tubular stem that is inserted into the oil testing passage of the crank case of a motor vehicle engine and connected to the vacuum system of the engine whereby upon pressing a button the vacuum draws out sufficient oil to actuate a small float that closes a valve and applies the vacuum to a diaphragm which closes a switch to the green light to indicate that the oil is up to the required level, but when the oil is low the float is not actuated and the green light circuit does not close.

The object of this invention is, therefore, to provide a combination vacuum and float actuated instrument that may be used in combination with the engine of a motor vehicle whereby a signal is provided to indicate whether or not the required amount of oil is in the crank case of the engine.

Another object of the invention is to provide an instrument for indicating when oil is required in an engine crank case that may be applied to motor vehicles without changing the engine or parts thereof.

A further object of the invention is to provide an oil level indicating device for motor vehicle engines which is of a simple and economical construction.

With these and other objects and advantages in view the invention embodies a button actuated switch adapted to be attached to the instrument board of a motor vehicle, a cylinder having a double piston therein actuated by the button of the switch and adapted to be connected in the vacuum system of the vehicle and a diaphragm actuated switch positioned to be actuated by the vacuum of the intake manifold to elevate the float in combination with the diaphragm.

Other features and advantages of the invention will appear from the following description taken in connection with the drawing wherein:

Figure 1 is a diagrammatic view showing the vertical section to the switch and also a similar section through diaphragm and float chambers of the device.

Figure 2 is a similar view on a smaller scale illustrating the device with the button depressed and with the float carried upwardly to close the valve to indicate that the oil is at the required level.

Referring now to the drawing wherein like reference characters denote corresponding parts the improved oil level indicator of this invention includes button actuated switch 10, vacuum control cylinder 11, float 12 in a chamber 13, a diaphragm 14, an open casing having an upper section 15 and a lower section 16, a switch 17, an elongated tube 18 having an inlet opening 19 therein and a button 20 for actuating the switch 10.

In the design as shown in Figure 1 the button 20 of the switch 10 is slidably mounted in a threaded nipple 21 which is secured in a base plate 22 between a packing hub 23 and a lock nut 24. A contact bar 25 extends from a flange 26 on the inner end of the bottom, the contact bar being insulated from the button by insulation 27.

The button 20 is resiliently held outwardly by a spring 28, and contact screws 29 and 30 are provided in an insulating strip 31 in one side of the switch housing.

The button 20 is formed with a core 32 into which a stem 33 extends and the lower end of the stem, which is provided with pistons 34 and 35 extends downwardly into the vacuum cylinder 11. With the parts as shown in Figure 1, a vacuum connection 36 is closed by the piston 35 and as the button 20 is pressed inwardly the piston 35 moves downwardly to the position shown in Figure 2 whereby communication is established through the cylinder, in the space between the pistons 34 and 35, from the connection 36 to a connection 37 which extends to the diaphragm and float chamber.

The stem 33 and pistons 34 and 35 are resiliently held upwardly, in the position shown in Figure 1, by a spring 38. The lower end of the cylinder 11 is mounted in a frame 39, on the upper end of which the base plate 22 is positioned, by a pin 40.

The tube 37 extends to a tube 41 on a cap 42 of the float chamber 13 and the upper end of the tube is connected to the interior of the casing of the diaphragm 14 through a nipple 43 that extends from the section 16 of the diaphragm casing, which is threaded into the upper end of the tube 41. The diaphragm 14 is secured between flanges 44 and 45 of the sections 15 and 16 respectively, of the diaphragm casing and the diaphragm is connected to a stem 46 which extends upwardly through the section 15 of the casing, by nuts 47. The diaphragm is urged upwardly by a spring 48 in the diaphragm casing and positioned between the diaphragm and base of the lower section 16 of the casing.

The lower end of the tube 41 is provided with a valve seat 49 and the float 12 is provided with a conical shaped valve 50 that is positioned to coact with the valve seat to close the lower end of the tube 41. The float 12 is resiliently held between springs 51 and 52 whereby the float remains in a neutral position substantially midway of the height of the float chamber.

The lower end of the float chamber is provided with a boss 53 in which a strainer 54 is secured by a nipple 55 and tube 18, which is threaded into the lower end of the nipple 55 extends downwardly through a test opening 56 of a crank case 57 whereby with the tube accurately positioned the opening 19 in the lower part thereof is positioned just below the oil level desired in the crank case. The tube 18 is provided with a set collar 58 which may be adjustably positioned on the tube 18 by a screw 59 with the opening 19 corresponding with the oil level in different types of engines.

In the design shown in Figure 2 the set collar 58 is omitted and the connections in lower end of the float chamber are positioned upon the upper end of a boss 60 of a crank case 61 through which the tube 18 may extend. It will also be understood that the tube may extend through a conventional cap in an oil filling tube in a crank case of a motor vehicle engine.

With the parts arranged in this manner and with the tube 36 connected to the vacuum system of the engine the button 20 is pressed inwardly whereby communication is established between the tubes 36 and 37 and with the parts around the float chamber and diaphragm closed the vacuum draws oil from the crank case 57, through the opening 19 and tube 18 into the float chamber 13. As the float moves upwardly closing the valve formed by the valve member 50 and seat 49, this causes the vacuum to draw the diaphragm 14 downwardly, to the position shown in Figure 2, whereby the stem 46 moves downwardly releasing the spring contact arm 62 of the switch 17 and the arm moves downwardly to engage the contact 63 to light the green light 64.

The contact arm 62 is connected by a wire 65 to the contact screw 29 and the contact bar 25 bridges the gap between the screws 29 and 30 whereby the circuit is completed through the wire 66 to a battery 67, the opposite terminal of which is grounded by a wire 68. The contact 63 is connected by a wire 69 to a terminal of the light 64 so that with the contact arm 62 engaging the contact 63 a complete circuit is established to light the green light.

Arm 62 is normally in the position shown in Figure 1 whereby it is in engagement with the contact 70 which is connected by the wire 71 to the red light 72 and with the red light grounded the circuit is completed to the red light through the wire 71, the contact 70, the spring contact arm 62, the wire 65, the contact bar 25 and screws 29 and 30, and the wires 66 to the battery.

With the parts arranged in this manner it will be noted that as the switch button 20 is pressed inwardly a circuit is completed instantly to light the red light and if there is sufficient oil in the crank case to permit oil to be drawn into the float chamber by the vacuum the diaphragm 14 is drawn downwardly, and the circuit is completed to the green light, whereas if the oil level in the crank case is below the opening 19 air is drawn through the tube 18 into the float chamber and the float remains in the position shown in Figure 1 so that the circuit is not completed to the green light and the red light remains on thereby indicating that oil is desired.

When the button 20 is released the spring 38 returns the piston 34 and 35 and also the button 20 to the released and inoperative position of the device and with the parts in these positions the vacuum in the area between the pistons 34 and 35 in the cylinder 11 and also in the tube 37 and lower part of the diaphragm casing is relieved by a relief opening 73 in the cylinder 11.

It will be understood that modifications may be made in the design and arrangement of the parts without departing from the spirit of the invention.

What is claimed is:

1. An oil level indicator comprising a float chamber, a tube extended from the float chamber to a case in which oil is positioned with the tube extended to a point below the desired level of oil in the case, a connection from the float chamber to vacuum providing means, a valve in the said vacuum connection of the float chamber, a float in the float chamber positioned to close the said valve, means closing the vacuum connection to the float chamber, a signal light, a switch for closing a circuit to the said signal light, means actuating the said switch of the signal light by the vacuum of the vacuum connection upon closing of the said valve by the float, and a button for opening the said vacuum connection.

2. An oil level indicator comprising a float chamber a tube extended from the float chamber to a case in which oil is positioned with the tube extended to a point below the desired level of oil in the case, a connection from the float chamber to vacuum providing means, a valve in the said vacuum connection of the float chamber, a float in the float chamber positioned to close the said valve, means closing the vacuum connection to the float chamber, a green signal light, a switch for closing a circuit to the said green signal light, means actuating the said switch of the signal light by the vacuum of the vacuum connection upon closing of the said valve by the float, a red signal light and a button for closing the circuit to the red signal light and opening the closing means of the said vacuum connection, said switch of the green signal light opening the circuit of the red signal light when said switch is actuated upon closing of the said valve by the float.

3. An oil level indicator comprising a float chamber a tube extended from the float chamber to a case in which oil is positioned with the tube extended to a point below the desired level of oil in the case, a connection from the float chamber to vacuum providing means, a valve in the said vacuum connection of the float chamber, a float in the float chamber positioned to close the said valve means closing the vacuum connection to the float chamber, a green signal light, a switch for closing a circuit to the said green signal light, a diaphragm having a stem extended therefrom for actuating the said switch of the signal light, said diaphragm actuated by the vacuum of the vacuum connection upon closing of the said valve by the float means actuating the said switch of the signal light by the vacuum of the vacuum connection upon closing of said valve by the float, a red signal light and a button for closing the circuit to the red signal light and opening the closing means of the said vacuum connection, said switch of the green signal light opening the circuit of the red signal light when said switch is actuated upon closing of the said valve by the float.

4. In an oil level indicator for crank cases of internal combustion engines, the combination which comprises a float chamber, a tube extended from the float chamber adapted to extend through the oil test opening of a crank case to a point below the desired level of oil in the crank case, a connection from the float chamber to the vacuum system of the engine, a valve in the said connection and positioned in the float chamber, a float in the said float chamber positioned to close the said valve when elevated by liquid in the float chamber, means for closing the vacuum connection to the float chamber, a diaphragm casing, a diaphragm extended across the diaphrag casing, one side of said diaphragm casing being connected to the vacuum connection to the said float chamber, a signal light, a switch in the circuit of the said signal light and positioned to be actuated by the diaphragm for closing the circuit to the said signal light, said diaphragm adapted to actuate the said switch and close the circuit to the signal light upon closing of the said valve in the float chamber by the float therein, and a button for actuating the closing means of the vacuum connection to the float chamber for opening said connection whereby vacuum is applied to the float chamber for drawing oil from the crank case into the float chamber to elevate the float for closing the valve in the said chamber.

5. In a motor vehicle engine oil level indicator, the combination which comprises a button switch having a vacuum passage therethrough, means in the switch for closing said vacuum passage, said closing means positioned whereby the vacuum passage is opened when the button of the switch is pressed inwardly, a float chamber, means connecting the vacuum passage of the button switch to the float chamber, a valve in the connection of the float chamber to the button switch, a float in the said float chamber positioned to close the said valve when the float is elevated by liquid in the float chamber, a tube extended from the float chamber into the oil of an engine, said tube having an opening therein positioned below the required oil level of the engine, a diaphragm casing, a diaphragm in the diaphragm casing, means connecting one side of the diaphragm casing to the vacuum connection of the float chamber, a switch having a spring arm therein, a red light mounted in the said button switch, a contact in the switch having the spring arm therein positioned to normally engage the said spring arm for closing a circuit to the said red light, a green light mounted in the said button switch, a contact in the switch having the spring arm therein positioned to be engaged by the arm for completing a circuit to the said green light, means for actuating the spring arm of the switch by the diaphragm, means closing the circuits of the red and green lights when the button of the said button switch is pressed inwardly, and suitable circuits connecting the parts whereby opening of the vacuum passage by the button switch applies suction to the float chamber whereby oil is drawn into the float chamber from the engine for elevating the float to close the valve in the connection of float chamber to the vacuum so that the suction of the vacuum is applied to the diaphragm for operating the switch having the spring arm therein whereby the circuit to the red light is broken and the circuit to the green light completed.

JAMES O. RABY.

REFERENCES CITED

The following references are of record in the file of this patent:

UNITED STATES PATENTS

| Number | Name | Date |
|---|---|---|
| 1,808,023 | Dienner | June 2, 1931 |
| 2,141,325 | Werder | Dec. 27, 1938 |
| 2,303,163 | Hall | Nov. 24, 1942 |